Aug. 7, 1945.  H. H. ABBOTT  2,381,096
UNIVERSAL JOINT
Filed Jan. 15, 1944    2 Sheets-Sheet 1
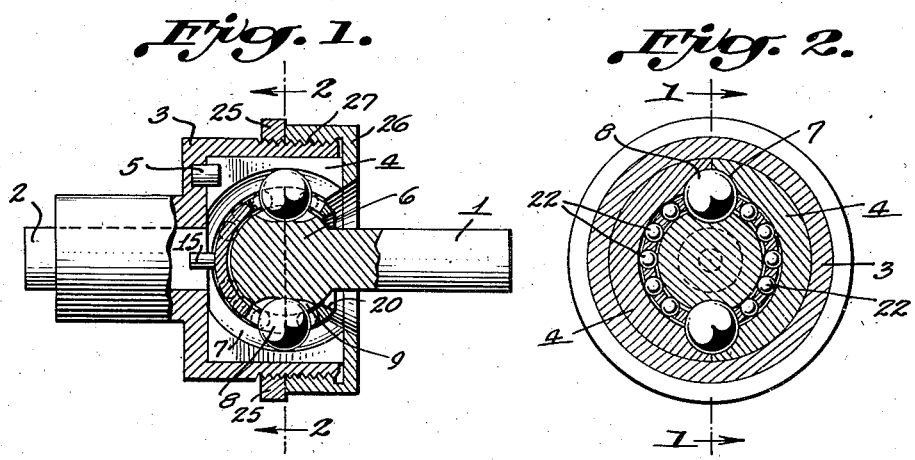
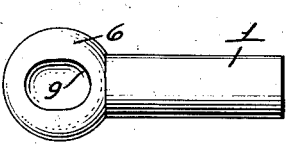
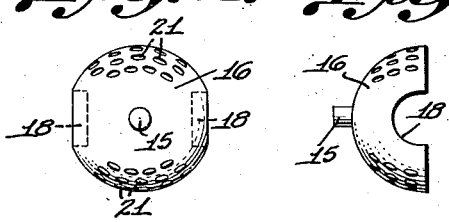
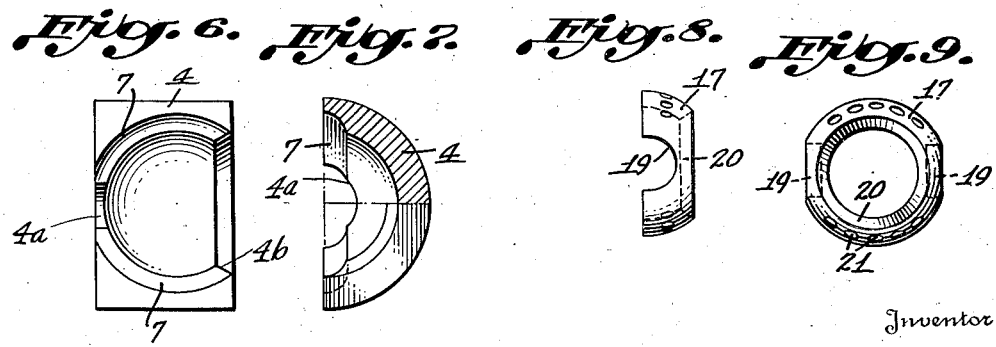
Inventor
HARRY H. ABBOTT
By Knight Bros.
Attorney Aug. 7, 1945.   H. H. ABBOTT   2,381,096
UNIVERSAL JOINT
Filed Jan. 15, 1944   2 Sheets-Sheet 2

Inventor
HARRY H. ABBOTT
By Knight Bros.
Attorney

Patented Aug. 7, 1945

2,381,096

UNITED STATES PATENT OFFICE 2,381,096

UNIVERSAL JOINT

Harry H. Abbott, Coldwater, Mich.

Application January 15, 1944, Serial No. 518,434

6 Claims. (Cl. 64—7)

This invention relates to a universal joint and more particularly to a universal coupling between two members which are designed for driving engagement despite angular variations between the members.

It is the object of the present invention to provide a universal joint which is rugged and lasting and which effectively serves as a coupling between a driving and a driven member to transmit the rotational movement between one and the other with minimum amount of vibration.

It is a further object of the invention to provide a universal joint having few parts which are economical to produce and easy to assemble.

It is a further object of the invention to provide a universal joint which will act as an efficient coupling between two transmission members despite the wearing of some of the parts in the course of use thereof.

Other objects and purposes will appear from the more detailed description of the invention following hereinafter, taken in conjunction with the accompanying drawings, wherein Fig. 1 is a vertical sectional view with certain parts in elevation of one preferred embodiment of the invention, the sectional view taken along 1—1 of Fig. 2;

Fig. 2 is a vertical sectional view along line 2—2 of Fig. 1;

Fig. 3 is a front elevation of one of the coupling members;

Fig. 4 is a left end view of one portion of the intermediate cage shown in section in Fig. 1;

Fig. 5 is a front view of the same portion of the cage, shown in section in Fig. 1;

Fig. 6 is a front elevation of one of the socket units outlining the spherical seat in the other one of the coupling members;

Fig. 7 is a right end view of Fig. 6 with certain parts in section;

Fig. 8 is a front elevation of the complemental portion of the intermediate cage member cooperating with that portion of the cage member shown in Fig. 5;

Fig. 9 is a right end view of Fig. 8;

Figure 10:
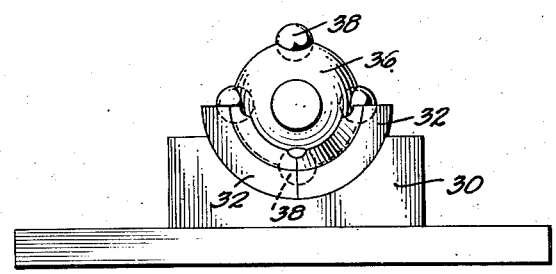
Fig. 10 is a front elevation of a different embodiment of the invention in the course of its assembly.
Figure 11:
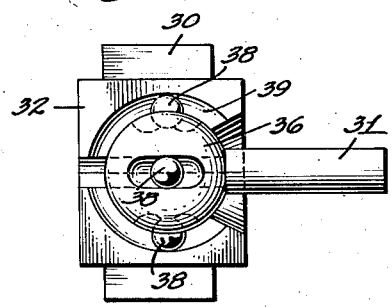
Fig. 11 is a top view of Fig. 10.
Figure 12:
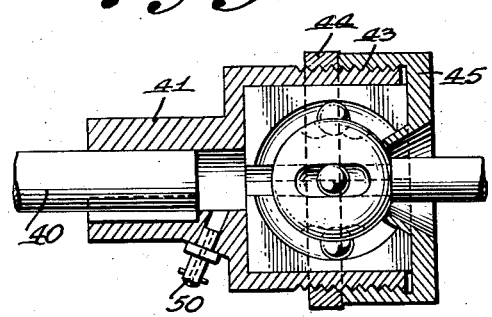
Fig. 12 shows a universal joint including the parts of the coupling unit shown in Fig. 11.
Figure 13:
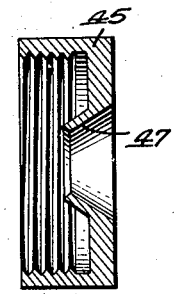
Fig. 13 is a sectional view of the locking sleeve for maintaining the universal joint of Fig. 12 in place.

In Fig. 1 is shown a universal joint adapted to effect a coupling between member 1 and member 2, one of which may be considered the driving member and the other the driven member, having the objective of transmitting the rotational movements of one to the other without vibration and despite angular inclinations of one with respect to the other. It may be assumed, for the sake of the present disclosure, that the driven member is represented by shaft 1 having the spherically shaped end 6, and the driving member is the shaft 2 having connected thereto the cylindrical housing or casing 3 which is externally threaded at 27. Within the housing 3 is formed a seat for the end 6 of the member 1 and this seat is formed by a plurality of socket units 4 which combine to make up a spherically shaped female seat portion for the male portion 6 of the member 1.

The socket units 4 are fixedly disposed in the housing 3 by the provision of a key 5 between one of the socket units and the housing, and the number of these units 4 depend upon the number of anti-friction balls 8, preferably formed of steel, which are disposed between members 4 and 6. In the illustrated embodiments shown in Figs. 1 to 9, there are two of such balls and for that reason the sockets 4 are two in number and are given an internal complementary spherical contour and are additionally grooved at 7 to accommodate the travel of the steel balls as the same rock along the internal surface of the seat. Cooperating elongated grooves 9 extending on each side of the transverse medial diameter of spherical end 6 of member 1 for seating parts of the spherical balls 8 are formed in the end member 6. These grooves 9 extend parallel to the axis of shaft 1 on the opposite sides of the transverse median line of the member 6 to permit a rocking of the member 1 and a consequent rolling of the balls 8 within the grooves 9 and 7.

More than two balls can be used in the assembly, in which case the number of socket units would be increased correspondingly so that an assembly having three socket units would utilize three spherical balls and an assembly having four socket units would utilize four balls, etc. The advantageous feature of the invention resides in the capability of machining the grooves 7 for the balls when such are disposed at the edges of the sockets so that each grooved seat for the ball is formed of parts of juxtaposed socket units.

In order to provide a more perfect and lasting universal joint, an intermediate cage is provided between the spherical seat formed by the socket units 4 and the spherically-shaped end 6 of member 1. This cage is shown in Figs. 4, 5, 8 and 9 and is formed of two parts. The portion 16 is disposed over the end of member 6 in the course of the assembly of the device. The complemental portion of the cage is formed by portion 17 provided with an opening 20 for the shaft 1. The complemental openings 18 and 19 in parts 16 and 17, respectively, form oval or slightly elongated openings to permit the extension of the ball members 8 therethrough as the same shift in position between parts 6 and 4. A large number of openings 21 are provided in the parts 16 and 17 for the purpose of receiving ball bearing members 22 which serve to take up the end thrust between the members 1 and 2 and in addition serve to maintain the parts in operative position with minimum amount of vibration, despite the fact that the grooves 7 and 9 and the balls 8 moving therein may wear in the course of time. This construction adapts the device to high precision installations.

A pin 15 is provided at the end of portion 16 for cooperation with the opening 4a at the left end of the socket units 4, for restricting the movement of the cage relative to the end 6 and socket units 4 so that at no time will the cage member move so far as to present any of the ball members 20 to the open end 4b of the socket units. This open beveled end 4b cooperates with the beveled end of the cover 26, to limit the relative angular movement between the parts 1 and 2.

A cylindrically shaped cover 26, having internal threads 27 thereon, is secured onto the housing 3 and is locked in place by the provision of lock nut 25 cooperating therewith to maintain the assembly in closely integrated condition.

While some of the advantages of the invention may be realized without the use of the small ball bearings 22, and by the use of the cage formed of parts 16 and 17 alone, it is preferred that as many as possible of these small balls be used to maintain the spacing between the members 6 and 4.

In the embodiment of the invention shown in Figs. 10 to 13, the universal joint is assembled without the interposition of a spacing cage with ball bearings therein. Nevertheless, this embodiment utilizes a socket formed of a plurality of parts in which the main anti-friction members ride in grooves formed in the adjacent edges of the several sections of the socket.

In Fig. 10 is shown a jig 30 disposed on a bench B for the purpose of receiving two of the annular segments 32, whereupon the lowermost ball 38 is disposed in the groove 39 preparatory to the setting of shaft member 31 and the spherical end 36 in place over the annular segments 32. Thereafter, the remaining three balls 38 can be set into place as shown in Fig. 10, which are covered by the remaining two annular segments 32. The driving member 40, with its housing 41 is slipped over the four annular segments 32 and are clamped in place by the engagement of the locking cover 45 over the threaded end of the housing 43, and the locking is secured by the turning up of the lock nut 44. A lubricating medium, such as grease, may be introduced into the assembly through fitting 50.

The inwardly directed flange 47 on the locking member 45 cooperates with the corresponding face formed by the several socket units 32 to limit the extent of the angular movement between the members 31 and 41, and further prevents the escape of grease from the joint or the dropping of the balls 38 from their raceways when the joint suffers looseness on account of wear.

Shafts 2 and 40 may vary in cross-sectional dimensions in dependence upon the work done, and smaller shafts may be used by means of the interposition of sleeves in the respective housings.

The universal joint constituting the first embodiment of the invention is assembled in a similar manner. The cage portions 16 and 17 with the balls therein are mounted on the end 6 before the balls 8 and socket units 4 are mounted thereon. Thereafter the housing 3 is slipped over the assembly and is closed by cover 26.

While I have described my invention as embodied in specific forms and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. A universal joint between two members comprising an externally threaded integral housing connected to one of said members, a plurality of socket units abutting each other and fixedly mounted within said housing and shaped on the interior thereof to form a spherical seat for the end of the other one of said members, said last-mentioned end formed as a sphere and provided with a plurality of grooves disposed equidistantly around the axis of said member and extending on each side of the transverse medial diameter of said spherically shaped end, said socket units also provided at their abutting surfaces with co-operating grooves overlying said first-mentioned grooves, a ball seated in each of said grooves, and an interiorly threaded cover for said housing adjacent the end of said second member for retaining said socket units in place.

2. A universal joint between two members comprising an integral housing connected to one of said members, a plurality of socket units abutting each other and fixedly mounted within said housing and shaped on the interior thereof to form a spherical seat for the end of the other one of said members, said last-mentioned end formed as a sphere and provided with a plurality of grooves disposed equidistantly around the axis of said member with each groove extending on each side of the transverse medial diameter of said spherically shaped end, said socket units also provided at their abutting surfaces with cooperating grooves overlying said first-mentioned grooves, a ball seated in each of said grooves, a spherically shaped cage intermediate said seat and spherical end of said other member and provided with openings to accommodate said balls, and a plurality of ball bearings in said cage for reducing the friction between said seat and said spherically shaped end.

3. A universal joint between two members comprising an integral housing connected to one of said members, a plurality of socket units abutting each other and fixedly mounted within said housing and shaped on the interior thereof to form a spherical seat for the end of the other one of said members, said last-mentioned end formed as a sphere and provided with a plurality of grooves disposed equidistantly around the axis of said member with each groove extending on each side of the transverse medial diameter of said spherically shaped end, said socket units also provided at their abutting surfaces with cooperating grooves overlying said first-mentioned grooves, a ball seated in each of said grooves, a spherically shaped cage intermediate said seat and spherical end of said other member and provided with oval-shaped openings to accommodate said balls, formed of two juxtaposed sections.

4. A universal joint between two members comprising an integral housing connected to one of said members, a plurality of socket units abutting each other and fixedly mounted within said housing and shaped on the interior thereof to form a spherical seat for the end of the other one of said members, said last-mentioned end formed as a sphere and provided with a plurality of grooves disposed equidistantly around the axis of said member with each groove extending on each side of the transverse medial diameter of said spherically shaped end, said socket units also provided at their abutting surfaces with cooperating grooves overlying said first-mentioned grooves, a ball seated in each of said grooves, a spherically shaped cage intermediate said seat and spherical end of said other member formed of a semi-spherical portion fitted within said first-member and a complementary portion fitted over the free end of said second member, a plurality of small ball bearings in both portions of said cage for reducing the friction between said seat and spherical end, and enlarged openings at the junction of said cage portions for accommodating said first-mentioned balls.

5. A universal joint between two members comprising an integral housing connected to one of said members, a plurality of socket units abutting each other and fixedly mounted within said housing and shaped on the interior thereof to form a spherical seat for the end of the other one of said members, said last-mentioned end formed as a sphere and provided with a plurality of grooves disposed equidistantly around the axis of said member with each groove extending on each side of the transverse medial diameter of said spherically shaped end, said socket units also provided at their abutting surfaces with cooperating grooves overlying said first-mentioned grooves, a ball seated in each of said grooves, a spherically shaped cage intermediate said seat and spherical end of said other member formed of a semi-spherical portion in engagement with said first member and a complementary portion fitted over the free end of said second member, a plurality of small ball bearings in both portions of said cage for reducing the friction between said seat and spherical end and for taking up the end thrust between said member, and slightly elongated openings at the junction of said cage portions for accommodating said first-mentioned balls.

6. A universal joint between two members comprising an externally threaded integral housing connected to one of said members, four annular segments abutting each other and fixedly mounted within said housing and shaped on the interior thereof to form a spherical seat for the end of the other one of said members, each of said segments subtending an angle of 90° on a common radius, said last-mentioned end formed as a sphere and provided with a plurality of grooves disposed equidistantly around the axis of said member and extending on each side of the transverse medial diameter of said spherically shaped end, said annular segments also provided at their abutting surfaces with cooperating grooves overlying said first-mentioned grooves, a ball seated in each set of grooves and an interiorly threaded cover for said housing adjacent to the end of said second member for retaining said annular segments in place and provided with an inwardly directed flange for restricting the relative angular movement between said members.

HARRY H. ABBOTT.